Figure 1:
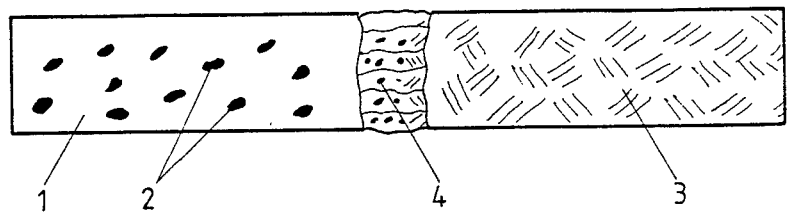

United States Patent [19]

Breitenmoser et al.

[11] Patent Number: 4,817,859

[45] Date of Patent: Apr. 4, 1989

[54] METHOD OF JOINING NODULAR CAST IRON TO STEEL BY MEANS OF FUSION WELDING

[75] Inventors: Georg Breitenmoser, Aadorf; Guy Faber, Oberrohrdorf, both of Switzerland

[73] Assignee: BBC Brown Boveri AG, Baden, Switzerland

[21] Appl. No.: 99,603

[22] Filed: Sep. 22, 1987

[30] Foreign Application Priority Data

Sep. 24, 1986 [CH] Switzerland ............... 3819/86

[51] Int. Cl.$^4$ ............... B23K 35/30; C21D 9/50
[52] U.S. Cl. ............... 228/226; 228/231; 228/232; 228/263.15; 219/146.1; 219/146.24; 420/117
[58] Field of Search ............... 228/205, 225, 226, 231, 228/232, 263.14, 263.15; 219/146.1, 146.24; 420/117; 428/682; 164/95

[56] References Cited

U.S. PATENT DOCUMENTS

| | | |
|---|---|---|
| 3,449,545 | 6/1969 | Petitt . |
| 4,426,426 | 1/1984 | Mühlberger ............... 228/263.15 |
| 4,436,554 | 3/1984 | Omae et al. ............... 219/146.41 |

FOREIGN PATENT DOCUMENTS

| | | |
|---|---|---|
| 0013323 | 7/1980 | European Pat. Off. . |
| 0058450 | 8/1982 | European Pat. Off. . |
| 1207770 | 12/1965 | Fed. Rep. of Germany . |
| 3009476 | 9/1980 | Fed. Rep. of Germany ............... 228/263.15 |
| 2082025 | 12/1971 | France . |
| 2170059 | 9/1973 | France . |
| 2251399 | 6/1975 | France . |
| 28532 | 2/1978 | Japan ............... 228/263.15 |
| 67649 | 6/1978 | Japan ............... 228/263.15 |
| 100946 | 8/1979 | Japan ............... 228/263.15 |

OTHER PUBLICATIONS

Metals Handbook, Ninth Edition, vol. 6, pp. 312-315, 602-604, Copyright 1983.

Primary Examiner—Nicholas P. Godici
Assistant Examiner—Samuel M. Heinrich
Attorney, Agent, or Firm—Oblon, Fisher, Spivak, McClelland & Maier

[57] ABSTRACT

A component made of nodular cast iron is joined to a component made of steel by means of fusion welding, a Fe alloy containing 2 to 4% by weight of silicon and seeding materials for the purpose of globular carbon precipitation in the welding zone being used as filler. Advantageously, the nodular cast iron component is provided beforehand with a build-up welding with Si-alloyed filler or with an unalloyed filler now alloyed with such a Si-alloyed filler, whereupon the weld joining to the steel component can be carried out with conventional iron electrodes.

Preferred Si-alloyed filler:
C=0.01-0.12% by weight,
Mn=0.2-1.5% by weight,
Si=1-4% by weight,
Al=0.005-0.1% by weight,
Mo=0.2-0.7% by weight,
Ce=0.0001-0.02% by weight,
Mg=0.0001-0.01% by weight,
Zr=0.01-0.7% by weight,
S=0.006% by weight max.,
P=0.01% by weight max.,
Fe=remainder 7 Claims, 2 Drawing Sheets

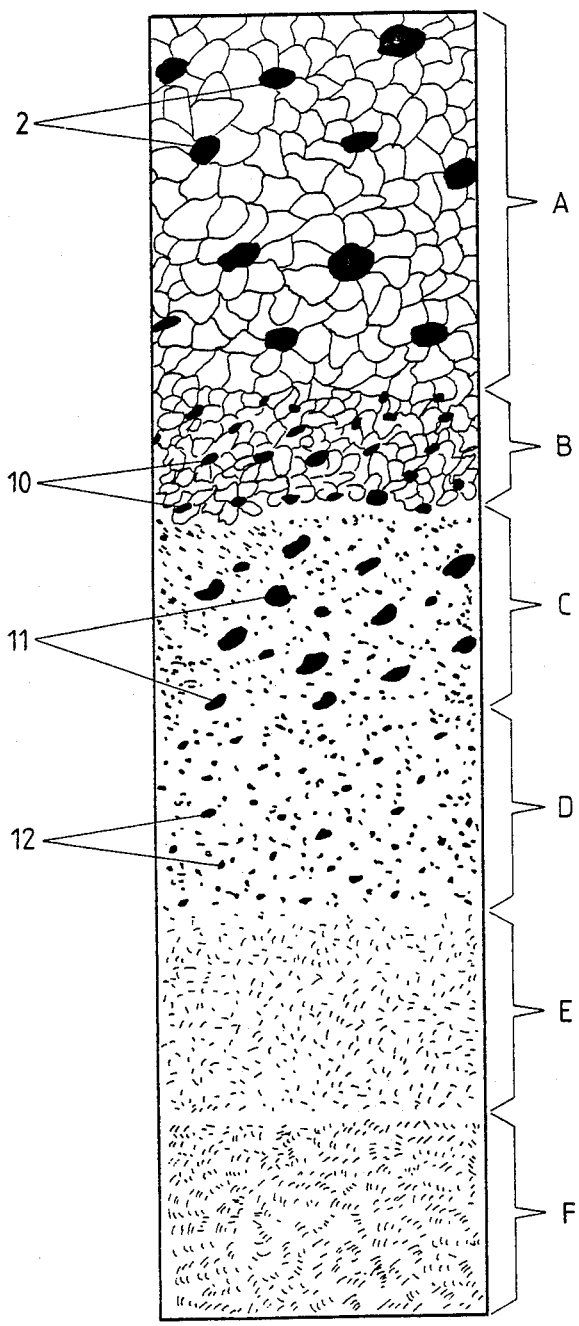

METHOD OF JOINING NODULAR CAST IRON TO STEEL BY MEANS OF FUSION WELDING

TECHNICAL FIELD

Use of nodular cast iron instead of cast steel in mechanical engineering for production engineering and economic reasons. Technology for joining nodular cast iron/steel for composite components.

The invention relates to the further development and improvement of the types of joint, characterized by poor weldability per se of nodular cast iron, with iron materials of lower carbon content.

In particular it relates to a method for joining nodular cast iron to steel by means of fusion welding.

PRIOR ART

Nodular cast iron/steel welded joints are particularly difficult to produce since carburization takes place on the low-carbon side with carbide formation which results in the formation of a brittle hard zone which cannot be eliminated by annealing.

Inter alia, it has already been proposed to accomplish the nodular cast iron/steel joint by one of the following methods:

1. Decarburization of the nodular cast iron surface to be joined to a depth of approx. 2 mm. Welding with iron electrodes.

This requires annealing in a decarburizing medium lasting up to 48 h and temperatures of 900° to 950° C. Such annealings are expansive and there is the danger of considerable warping of the nodular cast iron parts.

2. Welding with Fe/Ni electrodes containing 70% by weight of Ni and 30% by weight of Fe (cf. UTP-Schweissmaterial AG, CH-4310 Rheinfelden; G. Korfeld, "Zusatze zum Schwwissen von Eisengusswerkstucken" (Additives for welding cast iron workpieces), Giesserei 69, 1982, pages 112–119).

This method is only of limited applicability, mostly for repair work. The welded material is susceptible to thermal cracks and has only low mechanical strength.

3. Casting of the components to be joined (pipe, rod) of steel into the nodular cast iron part. The anchoring is guaranteed by irregularities (holes, bulges, knobs etc.) in the steel component, and therefore is predominantly of a mechanical and not a metallugical nature. Since the brittle edge zones in the steel component inecitably lead to large-area cracks, sealed joining cannot be achieved in this manner.

From the above it is evident that there is a lack of suitable methods for welding components made of nodular cast iron to those made of steel, it being necessary for the welding zone to have at least the mechanical properties of the nodular cast iron.

DESCRIPTION OF THE INVENTION

The invention is based on the object of providing a method for joining nodular cast iron to steel by means of fusion welding in which brittle hard zones leading to cracks and leaks are avoided. It should be possible t carry out the method with the simple means and economically.

This object is achieved by a method mentioned in the introduction wherein an iron alloy with a silicon content of 2 to 4% by weight is used as filler to which additionally seeding substances are added to precipitate the carbon in globular form in the welding zone.

METHOD OF EMBODYING THE INVENTION

The invention is described on the basis of the following exemplary embodiments explained in more detail by figures.

Figure 2:
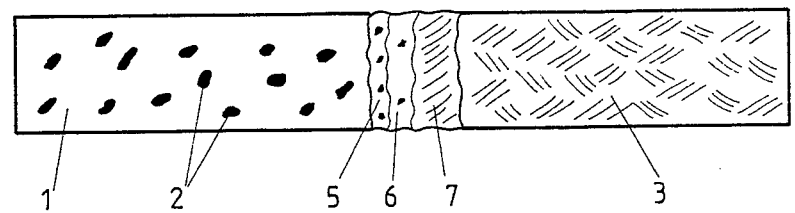
Figure 3:
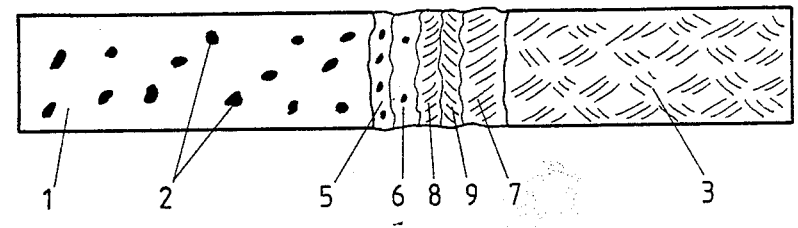

In these:

FIG. 1 shows a cross-section through a joint between nodular cast iron and steel by means of multi-layer direct welding with alloyed filler, FIG. 2 shows a cross-section through a joint between nodular cast iron and steel by means of multi-layer build-up welding with alloyed filler and weld joining with unalloyed filler, FIG. 3 shows a cross-section through a joint between nodular cast iron and steel by means of multi-layer build-up welding with alloyed and subsequent unalloyed filler and weld joining with unalloyed filler, FIG. 4 shows a diagrammatic metallographic cross-section through the weld material of a build-up weld with alloyed and unalloyed filler (microstructure).

FIG. 1 shows a diagrammatic representation (cross-section) of a joint between nodular cast iron and steel by means of a multi-layer direct welding with alloyed filler. For the sake of simplicity of a plain butt weld is drawn here. Of course, U welds, V welds or fillet welds etc. can be executed in this manner. 1 is a plate made of nodular cast iron with the included globular graphite 2. 3 is a plate made of steel (low-carbon iron alloy). 4 represents the weld joining with·Si-alloyed filler which as a rule is executed in multi-layer form. The relatively fine-grain globular graphite precipitations are indicated by black spots.

FIG. 2 diagrammatically represents a cross-section through a joint between nodular cast iron and steel by means of a multilayer build-up welding with alloyed filler and a weld joining with unalloyed filler. The plate made of nodular cast iron 1 with the globular graphite 2 has a built-up welding with Si-alloyed filler. 5 corresponds to a 1st layer and 6 to a 2nd layer of this build-up welding. The actual weld joining 7 is executed with unalloyed filler. 3 is the plate made of steel.

FIG. 3 shows diagrammatically a cross-section through a joint between nodular cast iron and steel by means of a multi-layer build-up welding consisting of welding material with alloyed and subsequent unalloyed filler and a weld joining with unalloyed filler. The reference numerals 1, 2, 3, 5, 6 and 7 correspond precisely to those in FIG. 2. In addition to the build-up welding 5, 6 with alloyed filler, a further two-layer build-up welding with unalloyed filler is also present. 8 corresponds to a 1st layer and 9 to a 2nd layer of this build-up welding.

FIG. 4 represents a diagrammatic metallographic cros-section through the welding material of a build-up welding with alloyed and unalloyed filler. The representation shows the zone-by-zone build-up of the microstructure. 2 is the globular graphite of the thermally unaltered nodular cast iron in the initial condition. 10 represents the globular graphite of the recooled solidified weld metal zone of the nodular cast iron. 11 is the globular graphite of the 1st layer of the build-up welding with Si-alloyed filler, while 12 shows the corresponding graphite of the 2nd layer with the same filler. A is the zone of the unaltered nodular cast iron. B represents the fused material of the weld metal zone of the nodular cast iron. C is the welding material of the 1st layer of the build-up welding with Si-alloyed filler. D corresponds to the welding material of the 2nd layer of the build-up welding with the same filler. E is the welding material of the 1st layer of the build-up welding and F is that of the 2nd layer of the build-up welding with unalloyed filler. In other respects, the Figure is self-explanatory. Attention should further be drawn to the fact that no fairly large, hard and brittle carbide precipitations occur in any of the zones. The matrices of all the zones are of a predominantly ferritic or ferritic-perlitic nature.

EXEMPLARY EMBODIMENT I

See FIG. 1!

Plates made of nodular cast iron 1 and low-carbon steel 3 were joined together directly by art welding with Si-alloyed filler. The plates had the following dimensions:
  Width=100 mm
  Length=200 mm
  Thickness=20 mm
The nodular cast iron had the following composition:
  C=3.2% by weight,
  Si=1.9% by weight,
  Mn=0.6% by weight,
  Ni=1.4% by weight,
  Mg=0.06% by weight,
  Fe+impurities=remainder
The steel 3 with the commercial designation St 37 according to DIN 17 100 had the following composition:
  C:=0.2% by weight,
  P:=0.05% by weight,
  S:=0.05% by weight,
  Fe+Si+Mn=remainder
The chemical composition of the welding electrode and the corresponding electrode coating was matched in a manner such that a welding material of the following compositin was produced in the arc welding:
  C=0.08% by weight,
  Mn=0.45% by weight,
  Si=3.0% by weight,
  Al=0.0075% by weight,
  Mo=0.55% by weight,
  Ce=0.0013% by weight,
  Mg=0.0006% by weight,
  Zr=0.04% by weight,
  S=0.004% by weight,
  P=0.02% by weight,
  Fe=remainder The plates to be welded together were preheated to approx. 400° C. before the welding operation and the weld region was held at 350° to 500° C. After completion of the welded seam, the workpiece was immediately heated up to an annealing temperature of 700° to 710° C. without being cooled down and this temperature was maintained for 6 h. In this process any carbides formed in the weld zone were converted into temper carbon (see also FIG. 4!). The workpiece was then allowed to cool in the furnace.

Test pieces were then machined from the workpiece. The tensile test piece and the edge-bend test piece revealed that the fracture always occurred outside the welding seam or the transition zone, vis. in the unaltered structure of the nodular cast iron. Apparent yield points of approx. 300 MPa, ultimate tensile strengths of approx. 400 MPa and bend angles of up to 35° were reached.

EXEMPLARY EMBODIMENT II

Compare FIG. 1!

A steel pipe was welded as an addition onto a pump housing of nodular cast iron. The latter had the following dimensions:
  Outside diameter=48 mm
  Inside diameter=40 mm
  wall thickness=4 mm
The nodular cast iron, which had the commercial designation CCC 40 had the following composition:
  C=2.9% by weight,
  Si=2.7% by weight,
  Mn=0.5% by weight,
  P=0.08% by weight,
  S=0.015% by weight,
  Fe=remainder
The steel pipe material, which had the commercial designation St.35.8 in accordance with DIN 17 175 had the following composition:
  C=0.17% by weight,
  Si=0.1 to 0.35% by weight,
  Mn=0.4 to 0.8% by weight,
  S=0.04% by weight
The workpieces were first preheated to 380° to 400° C. and then the tube was welded onto the pump housing with a normal fillet weld with an alloyed welding electrode of the composition as specified in Example 1. The workpiece was then heated immediately, without cooling, to a temperature of 720° to 750° C. and annealed at this temperature for 4 h.

The pipe, which was sectioned in the longitudinal direction, was subjected to a bend test. It was possible to bend both the concave and also the convex half of the pipe connecting piece (viewed in the bending direction) satisfactorily through 90° without incipient cracking.

EXEMPLARY EMBODIMENT III

See FIG. 2!

Plates made of nodular cast iron and low-carbon steel 3 were assembled into a workpiece by build-up welding 5, 6 and weld joining (7) by the arc welding process. The dimensions of the plates correspond to those of Example I. The nodular cast iron with the commercial designation GGG 40 had the composition as specified in Example II, and the steel with the commercial designation St 37 that specified in Example I.

First two layers 5, 6 of welding material made of Si-alloyed filler each 3 mm thick as specified in the composition in Example I were applied to an end face of the nodular cast iron plate 1. The nodular cast iron was preliminarily preheated to a temperature of approx. 375° C. Then a multi-layer weld joining 7 was made between the nodular cast iron 1 prepared in this manner by build-up welding and the steel 3 by means of an unalloyed electrode. The welding electrode had the following composition:
  C=0.03 to 0.04% by weight,
  Si=0.3% by weight,
  Mn=0.6% by weight,
  Fe+impurities=remainder
Finally, the workpiece was annealed for 5 h at a temperature of 730° C. without being cooled down.

The samples revealed the following pattern:
  Apparent yield point:=approx. 320 MPa
  Ultimate tensile strength:=approx. 420 MPa
  Bend angle:=approx. 401° C.

EXEMPLARY EMBODIMENT IV

Along the lines of Example III, but with a different, partially reversed lay sequence, a steel pipe with the commercial designation St.35.8 was "embedded" in a steam turbine cylinder made of nodular cast iron with the commercial designation GGG 40. In this process, the tube to be embedded was preheated to 200° C. at the part to be joined to the nodular cast iron and provided with a 2 mm thick layer of build-up welding of Si-alloyed filler according to the specification specified in Example I over a width of 10 mm. After cooling down, the pipe was inserted into the casting mould in a manner such that its end projected into the space to be filled with the melt and had the above nodular cast iron material cast around it. The Si-alloyed welding material had the effect that on cooling down, the carbon in the transition zone was not present as iron/carbide phase, but the temper carbon is precipitated. This pevented cracks being produced in the transition zone on complete cooling of the workpiece or subsequently in operation

EXEMPLARY EMBODIMENT V

Compare FIGS. 3 and 4!

The following preparatory operations were executed on a casting made of nodular cast iron 1 of the composition specified in Example I after preheating to 375° C.:
- two-layer build-up welding 5, 6, each layer 3 mm thick, with Si-alloyed filler of the composition specified in Example I.
- two-layer build-up welding 8, 9, each layer 2.5 mm thick, with unalloyed filler of the composition specified in Example III.
- annealing of the workpiece for 6 h at a temperature of 740° C.

Slow cooling of the workpiece in the furnace.

In this process, the uppermost layer of the buildup welding with unalloyed filler had a C content which was only approx. 0.2 to 0.4% by weight.

The workpiece was now transferred to the machine shop. There components 3 made of St.37 were welded on with an unalloyed iron electrode at the build-up welding points after a preheating to 250° C. A subsequent additional heat treatment was unnecessary.

Break test samples taken from the bonding zones revealed that the material always underwent incipient cracking outside the welding material and the transition zones. Values of the apparent yield point of an average 330 MPa and those of the ultimate tensile strength of an average 440 MPa were achieved. Bending angles in welded-on rods and pipes yielded values of 60° to 90° without break.

The method is not limited to the exemplary embodiments. In principle, high-carbon iron materials containing the carbon in elementary form can be joined in this manner to low-carbon iron materials.

An iron alloy containing 2 to 4% by weight of silicon is advantageously used as filler for the direct weld joining or the build-up welding on the high-carbon material. The filler should additionally contain in the core wire and/or the coating seeding materials which guarantee the precipitation of carbon in globular form in the welding zone (actual welding seam and traisition zones). A welding electrode for arc welding is preferably used as filler.

The method may be executed as a direct joining method with Si-alloyed filler or as a method with one or several build-up weldings (2 to 3 layers) with alloyed and unalloyed filler. In the latter cases, the actual weld joining may be carried out with a conventional unalloyed filler. The build-up welding can be carried out in the foundry, it being possible to omit preparations such as mechanical machining or etching. The workpieces joined by the fusion welding are preferably annealed at 700 to 750° C. for ½ to 6 h. This applies also to substeps, for example after the build-up welding. Under these circumstances, carbides are reliably converted into globular temper carbon. Expediently, the workpieces are preheated to a temperature of 250° to 500° C. before the fusion welding.

Advantageously, the filler used for welding may have the following composition limits:
C=0.01–0.12% by weight,
Mn=0.2=–1.5% by weight.
Si=1=–4% by weight,
Al=0.005–0.1% by weight,
Mo=0.2=–0.7% by weight,
Ce=0.0001–0.02% by weight,
Mg=0.0001–0.01% by weight,
Zr=0.01=–0.7% by weight,
S=0.0006% by weight max.,
P=0.01% by weight max.,
Fe=remainder

List of Designations

1: Nodular cast iron
2: Globular graphite of nodular cast iron
3: Steel
4: Multi-layer weld joining with Si-alloyed filler
5: 1st layer of build-up welding with Si-alloyed filler
6: 2nd layer of build-up welding with Si-alloyed filler
7: Weld joining with unalloyed filler
8: 1st layer of build-up welding with unalloyed filler
9: 2nd layer of build-up welding with unalloyed filler
10: Globular graphite of the weld metal zone of the nodular cast iron
11: Globular graphite of the 1st layer of the build-up welding with Si-alloyed filler
12: Globular graphite of the 2nd layer of the build-up welding with Si-alloyed filler
A: Unaltered nodular cast iron
B: Solidified material of the weld metal zone of the nodular cast iron
C: Welding material of 1st layer of build-up welding with Si-alloyed filler
D. Welding material of 2nd layer of build-up welding with Si-alloyed filler
E. Welding material of 1st layer of build-up welding with unalloyed filler
F. Welding material of 2nd layer of build-up welding with unalloyed filler

We claim:

1. A method for joining nodular cast iron to steel by means of fusion welding, with an iron alloy filler having the composition:
C=0.01–0.12% by weight,
Mn=0.2–1.5% by weight,
Si=1–4% by weight,
Al=0.005–0.1% by weight,
Mo=0.2–0.7% by weight,
Ce=0.0001–0.02% by weight,
Mg=0.0001–0.01% by weight,
Zr=0.01–0.7% by weight,
S=0.006% by weight max.,
P=0.01% by weight max., Fe=remainder, to which additional seeding substances are added to precipitate the carbon in globular form in the welding zone.

2. The method as claimed in claim 1, wherein the filler is present in the form of a welding electrode and is applied to the workpieces to be joined by the arc welding method.

3. The method as claimed in claim 1, wherein, before the actual joining, first 2 to 3 layers of filler with a silicon content of 2 to 4% by weight is applied to the nodular cast iron as build-up welding and a weld joining is then carried out with unalloyed filler.

4. The method as claimed in claim 3, wherein, after the application of 2 to 3 layers of filler with a silicon content of 2 to 4% by weight to the nodular cast iron, additionally up to 2 further layers of unalloyed filler are applied.

5. The method as claimed in claim 3, wherein the build-up welding on the nodular cast iron is executed in the foundry is executed directly on the cleaned raw casting without substantial preliminary preparation such as mechanical machining or etching.

6. The method as claimed in claim 1, wherein the workpieces joined by fusion welding are additionally subjected to annealing at 700° to 750° C. for a duration of ½ to 6 h for the purpose of globular precipitation of the carbon in the form of temper carbon in the welding zone and in the adjacent zones.

7. The method as claimed in claim 1, wherein the workpieces to be joined are preheated to a temperature of 250° to 500° C. before the fusion welding.

* * * * *